US008601133B1

(12) United States Patent
Rainovic et al.

(10) Patent No.: US 8,601,133 B1
(45) Date of Patent: Dec. 3, 2013

(54) HIGHLY SCALABLE DATA CENTER ARCHITECTURE WITH ADDRESS RESOLUTION PROTOCOL (ARP)-FREE SERVERS

(75) Inventors: George Rainovic, Nashua, NH (US); Chandra Pandey, Lunenburg, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 353 days.

(21) Appl. No.: 12/967,136

(22) Filed: Dec. 14, 2010

(51) Int. Cl.
*G06F 15/16* (2006.01)
*G06F 9/46* (2006.01)

(52) U.S. Cl.
USPC ........... 709/227; 709/228; 709/229; 718/100; 718/101; 718/102; 718/103; 718/104; 718/105; 718/106; 718/107; 718/108

(58) Field of Classification Search
None
See application file for complete search history.

(56) References Cited

U.S. PATENT DOCUMENTS

| | | | | |
|---|---|---|---|---|
| 5,195,086 A * | 3/1993 | Baumgartner et al. | ....... | 370/264 |
| 6,640,248 B1 * | 10/2003 | Jorgensen | ...................... | 709/226 |
| 6,650,641 B1 * | 11/2003 | Albert et al. | ................... | 370/392 |
| 6,850,981 B1 * | 2/2005 | Ho et al. | ......................... | 709/227 |
| 6,862,622 B2 * | 3/2005 | Jorgensen | ...................... | 709/226 |
| 7,068,632 B1 * | 6/2006 | Ho et al. | ......................... | 370/338 |
| 7,496,674 B2 * | 2/2009 | Jorgensen | ...................... | 709/230 |
| 7,630,351 B1 * | 12/2009 | Ho et al. | ......................... | 370/338 |
| 7,802,000 B1 * | 9/2010 | Huang et al. | ................... | 709/228 |
| 7,840,981 B2 * | 11/2010 | Atwater et al. | ................. | 725/51 |
| 7,885,546 B2 * | 2/2011 | Liu et al. | .......................... | 398/98 |
| 8,010,679 B2 * | 8/2011 | Low et al. | ...................... | 709/227 |
| 8,144,686 B2 * | 3/2012 | Sahni et al. | ..................... | 370/351 |
| 2002/0133608 A1 * | 9/2002 | Godwin et al. | ............... | 709/230 |
| 2005/0249199 A1 * | 11/2005 | Albert et al. | ................... | 370/352 |
| 2006/0031407 A1 * | 2/2006 | Dispensa et al. | ............. | 709/219 |
| 2006/0129695 A1 * | 6/2006 | Faibish et al. | ................. | 709/245 |
| 2007/0058526 A1 * | 3/2007 | Jain et al. | ....................... | 370/216 |
| 2007/0088822 A1 * | 4/2007 | Coile et al. | .................... | 709/224 |
| 2008/0002663 A1 * | 1/2008 | Tripathi et al. | ............... | 370/351 |
| 2008/0259954 A1 * | 10/2008 | Sahni et al. | .................... | 370/468 |
| 2009/0328048 A1 * | 12/2009 | Khan et al. | .................... | 718/102 |
| 2010/0080196 A1 * | 4/2010 | Ho et al. | ........................ | 370/336 |
| 2010/0241710 A1 * | 9/2010 | Renfroe et al. | ............... | 709/204 |
| 2010/0251329 A1 * | 9/2010 | Wei | ..................................... | 726/1 |
| 2010/0265947 A1 * | 10/2010 | Kokot et al. | .................... | 370/390 |
| 2010/0325257 A1 * | 12/2010 | Goel et al. | ..................... | 709/223 |
| 2011/0167472 A1 * | 7/2011 | Evans et al. | ........................ | 726/1 |
| 2011/0185073 A1 * | 7/2011 | Jagadeeswaran et al. | ..... | 709/228 |
| 2012/0016973 A1 * | 1/2012 | Haris et al. | .................... | 709/220 |
| 2012/0036231 A1 * | 2/2012 | Thakur et al. | ................. | 709/220 |
| 2012/0042095 A1 * | 2/2012 | Kotha et al. | .................... | 709/233 |
| 2012/0117379 A1 * | 5/2012 | Thornewell et al. | .......... | 713/155 |
| 2012/0311597 A1 * | 12/2012 | Manula et al. | ................. | 718/104 |

\* cited by examiner

*Primary Examiner* — Backhean Tiv
(74) *Attorney, Agent, or Firm* — Harrity & Harrity, LLP

(57) ABSTRACT

A network device establishes a logical channel with each server device of multiple server devices, where each logical channel is not shared with another server device of the multiple server devices. The network device also determines a network loopback Internet protocol (IP) address for each server device of the multiple server devices, and associates each network loopback IP address with a corresponding logical channel. The network device further receives a packet destined for a particular server device, and provides the packet to the particular server device via the logical channel associated with the particular server device.

20 Claims, 9 Drawing Sheets

HIGHLY SCALABLE DATA CENTER ARCHITECTURE WITH ADDRESS RESOLUTION PROTOCOL (ARP)-FREE SERVERS

BACKGROUND

Existing network architectures for high-density distributed data centers use several flat Layer 2 (i.e., a data link layer of the seven-layer Open Systems Interconnection (OSI) model) Ethernet networks for connecting servers of the data centers. The servers in the data centers need to be connected to the same broadcast domains to allow live migration of virtual machines (VMs) provided within the servers. A virtual machine is a software implementation of a machine (e.g., a computer) that executes instructions like a physical machine. System virtual machines permit sharing of underlying physical machine (e.g., server) resources between different virtual machines, with each system virtual machine running its own operating system. A software layer providing the virtualization is called a virtual machine monitor or hypervisor. A hypervisor can run on hardware or on top of an operating system.

Servers located in remote data centers may typically be connected using Layer 2 tunnels (e.g., virtual private local area network (LAN) service (VPLS) tunnels or Layer 2 virtual private network (L2VPN) tunnels). Network components (e.g., network interfaces) of data center servers may tie together Layer 2 and Layer 3 (e.g., a network layer of the OSI model) network elements. In order to communicate with one another, the data center servers need to use or maintain Address Resolution Protocol (ARP) tables to locate media access control (MAC) addresses of other servers in the data center. ARP is a computer networking protocol for determining a network host's Layer 2 or hardware address when only the host's Internet Layer or Layer 3 address is known. The ARP tables help translate an Internet protocol (IP) address to a MAC address in order to assist in encapsulation of IP packets to Ethernet frames.

SUMMARY

According to one aspect, a method may be implemented by a network device provided in a high density data center. The method may include establishing, by the network device, a logical communication channel with each server device of multiple server devices, where each logical communication channel is not shared with another server device of the multiple server devices. The method may also include determining, by the network device, a network loopback IP address for each server device of the multiple server devices, and associating, by the network device, each network loopback IP address with a corresponding logical communication channel.

According to another aspect, a network device may be provided in a high density data center that includes multiple server devices. The network device may include a memory to store a plurality of instructions, and a processor to execute instructions in the memory to establish a logical channel with each server device of the multiple server devices, where each logical channel is not shared with another server device of the multiple server devices. The processor may further execute instructions in the memory to determine a network loopback IP address for each server device of the multiple server devices, associate each network loopback IP address with a corresponding logical channel, receive a packet destined for a particular server device, and provide the packet to the particular server device via the logical channel associated with the particular server device.

According to still another aspect, one or more non-transitory computer-readable media may store instructions executable by one or more processors provided in a network device. The media may store one or more instructions for establishing a logical communication channel with each virtual machine of multiple virtual machines, where each logical communication channel is not shared with another virtual machine of the multiple virtual machines; determining a network loopback IP address for each virtual machine of the multiple virtual machines; associating each network loopback IP address with a corresponding logical communication channel; receiving a packet destined for a particular virtual machine; and providing the packet to the particular virtual machine via the logical communication channel associated with the particular virtual machine.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods described herein may provide a highly scalable data center architecture with ARP-free servers. For example, the systems and/or methods may provide a logical communication channel between each server device (e.g., of a data center) and a network device (e.g., a router). Each logical communication channel may be dedicated to a particular server device and may not be shared with another server of the data center. Thus, each logical communication channel may provide a point-to-point link between the particular server device and the network device.

In an example implementation, the systems and/or methods may establish a logical communication channel with each server device (or each virtual machine executing on a server device), where each logical communication channel is not shared with another server device (or virtual machine). The systems and/or methods may determine a network loopback IP address for each server device (or virtual machine), and may associate each network loopback IP address with a corresponding logical communication channel. The systems and/or methods may receive a packet destined for a particular server device (or virtual machine), and may provide the packet to the particular server device (or virtual machine) via the logical communication channel associated with the particular server device (or virtual machine).

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

A "network loopback IP address," as used herein, is intended to be broadly construed to include an IP address not associated with any particular interface, a network interface independent IP address. A network loopback IP address may include its own network (e.g., a network /32 address, for IP version 4 (IPv4) or a network /128 address, for IP version 6 (IPv6)).

Figure 1:
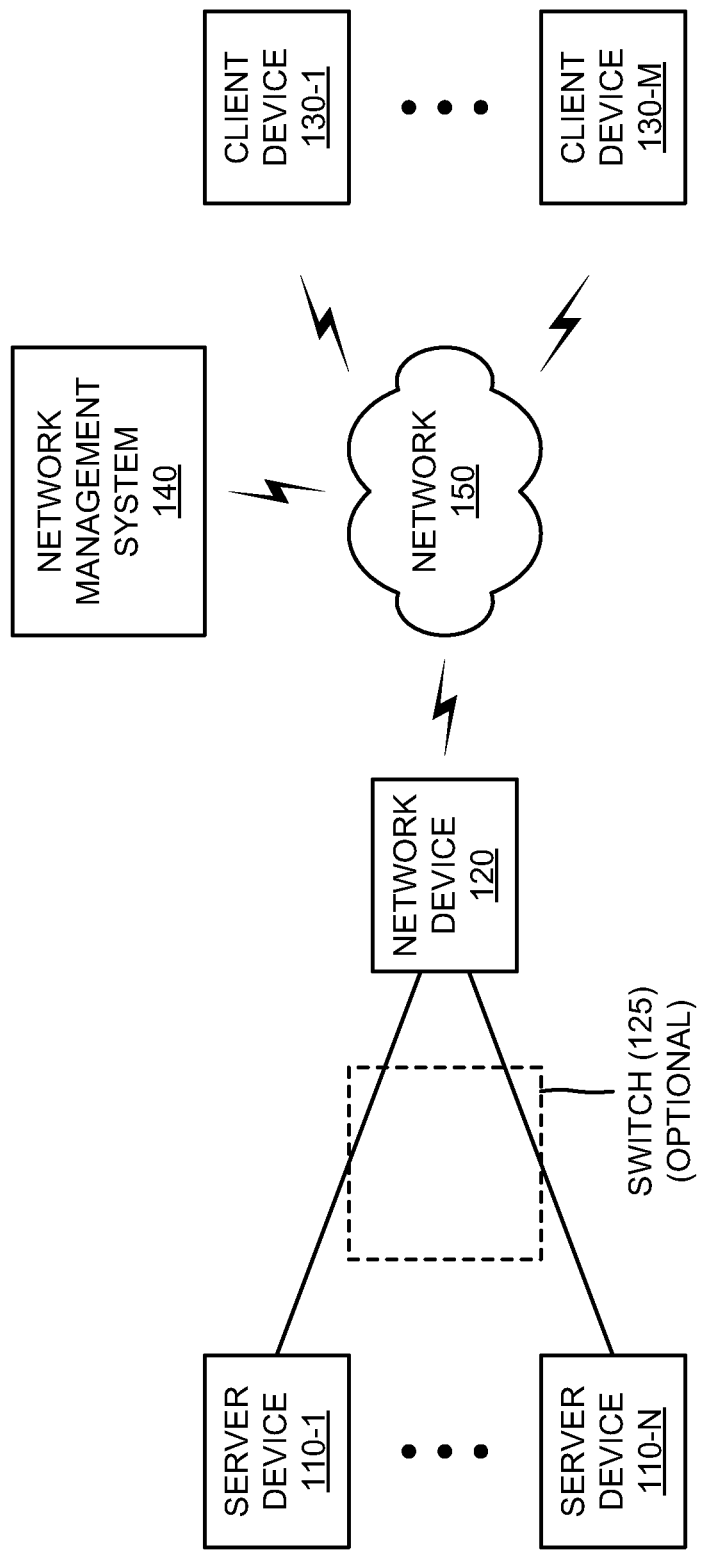
FIG. 1 is a diagram of an example network in which systems and/or methods described herein may be implemented.

FIG. 1 is a diagram of an example network 100 in which systems and/or methods described herein may be implemented. As illustrated, network 100 may include multiple server devices 110-1 through 110-N (collectively referred to herein as "server devices 110," and singularly as "server device 110"), a network device 120, an optional switch 125, multiple client devices 130-1 through 130-M (collectively referred to herein as "client devices 130," and singularly as "client device 130"), and a network management system 140 interconnected by a network 150. Components of network 100 may interconnect via wired and/or wireless connections or links. Two server devices 110, one network device 120, one switch 125, two client devices 130, one network management system 140, and one network 150 have been illustrated in FIG. 1 for simplicity. In practice, there may be more server devices 110, network devices 120, switches 125, client devices 130, network management systems 140, and/or networks 150. Also, in some instances, one or more of the components of network 100 may perform one or more tasks described as being performed by another one or more of the components of network 100.

In one example implementation, server devices 110, network device 120, switch 125, network management system 140, and network 150 may provide a high density distributed data center for client devices 130. In another example implementation, the features of switch 125 may be incorporated within network device 120, and switch 125 may be omitted.

Server device 110 may include one or more server devices, or other types of computation or communication devices, that gather, process, search, and/or provide information in a manner described herein. In one example implementation, server devices 110 may include the features of server devices provided in a high density distributed data center. For example, if the data center provides telecommunication services, server devices 110 may be used to operate and manage a telecommunication network, provide data center based applications directly to the telecommunication network's customers (e.g., client devices 130), or provide hosted applications for a third party to provide services to their customers (e.g., client devices 130). In another example implementation, server device 110 may establish a logical communication channel with network device 120 (e.g., that may not be shared with another server device 110). Server device 110 may be configured with a network loopback IP address (e.g., of server device 110 or a virtual machine of server device 110). In one example implementation, the network loopback IP address may be provisioned in an operating system (OS) of server device 110 or a virtual machine; may be provisioned in a hypervisor and communicated to server device 110 or a virtual machine; or may be assigned by network device 120 to server device 110 or virtual machine through the logical communication channel. Network device 120 may associate the network loopback IP address with the logical communication channel corresponding to server device 110.

Network device 120 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In an example implementation, network device 120 may include a device that is capable of transmitting information to and/or receiving information from server devices 110, client devices 130, and/or network management system 140.

In one example implementation, network device 120 may establish a logical communication channel with each server device 110 (or each virtual machine executing on server device 110), where each logical communication channel is not shared with another server device 110 (or virtual machine). Network device 120 may associate each network loopback IP address with a corresponding logical communication channel. Network device 120 may receive a packet destined for a particular server device 110 (or virtual machine), and may provide the packet to the particular server device 110 (or virtual machine) via the logical communication channel associated with the particular server device 110 (or virtual machine).

Switch 125 may include a traffic transfer device, such as a gateway, a router, a switch, a firewall, a NIC, a hub, a bridge, a proxy server, an OADM, or some other type of device that processes and/or transfers traffic. In an example implementation, switch 125 may include an Ethernet switch or another device that is capable of multiplexing traffic (e.g., received from network device 120), and providing the multiplexed traffic to one or more server devices 110. Switch 125 may receive traffic from server devices 110, may aggregate the traffic, and may provide the aggregated traffic to network device 120. In one example implementation, switch 125 may be replaced with a software-based Ethernet switch that may enable multiple server devices 110 (or VMs of server devices 110) to have access to a single physical Ethernet port.

Client device 130 may include any device that is capable of accessing server devices 110 via network device 120 and network 150. For example, client device 130 may include a workstation computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a smartphone, a laptop computer, a personal computer, or other types of computation or communication devices.

Network management system 140 may include one or more server devices, or other types of computation or communication devices, that gather, process, search, and/or provide information in a manner described herein. In one example implementation, network management system 140 may monitor and administer a network (e.g., network 100) and/or components (e.g., server devices 110, network device 120, etc.) of a network. Network management system 140 may identify a problem or fault in a network, may determine source(s) of the problem, and may solve the problem. Network management system 140 may also collect statistics (e.g., of components of network 100) over a period of time.

Network 150 may include a local area network (LAN), a wide area network (WAN), a metropolitan area network (MAN), a Wi-Fi network, an intranet, the Internet, an optical fiber (or fiber optic)-based network, or a combination of networks.

Although FIG. 1 shows example components of network 100, in other implementations, network 100 may include fewer components, different components, differently arranged components, or additional components than depicted in FIG. 1.

Figure 2:
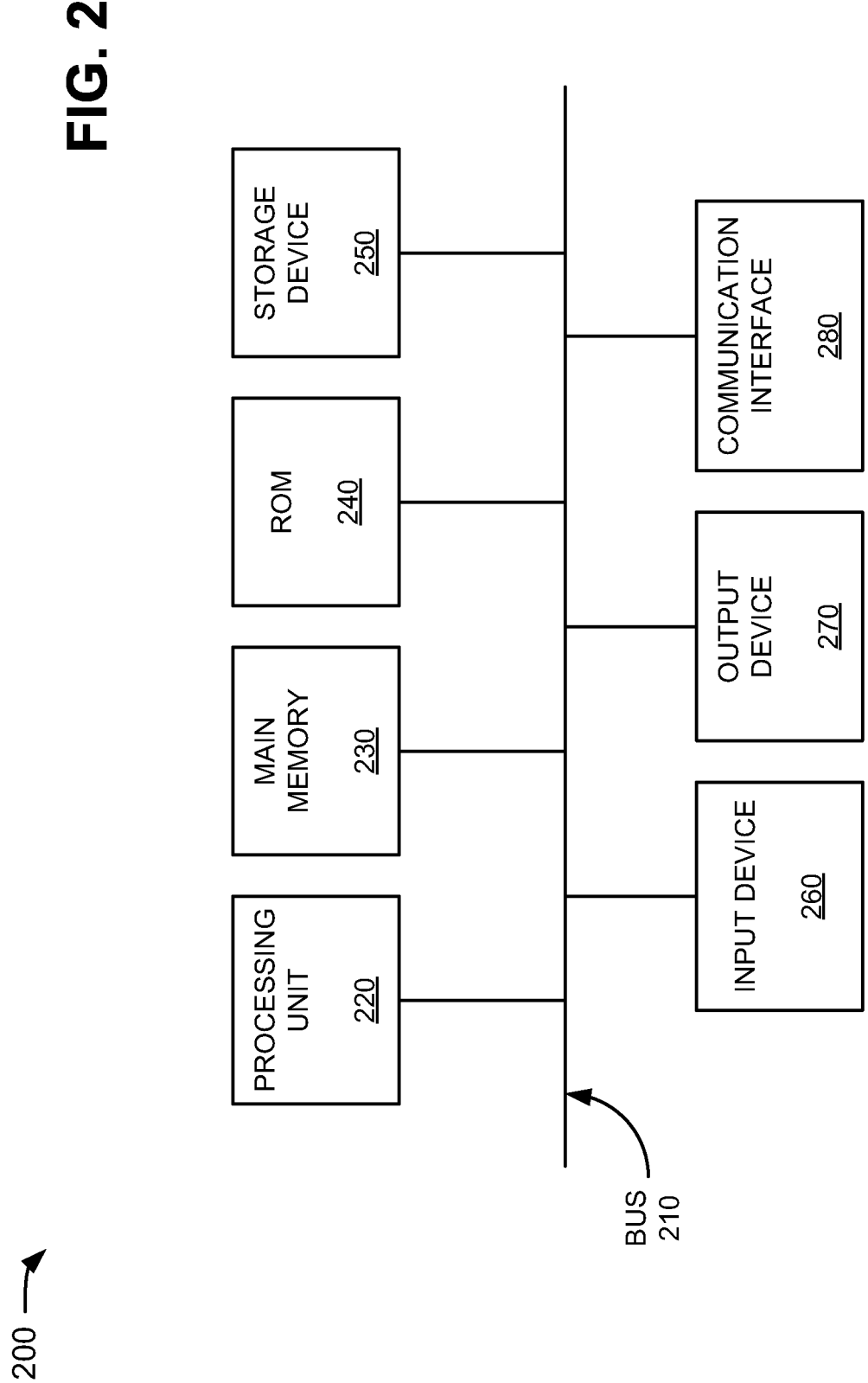
FIG. 2 is a diagram of example components of a server device depicted in FIG. 1.

FIG. 2 is a diagram of example components of a device 200 that may correspond to one of server devices 110 or one of client devices 130 (FIG. 1). As illustrated, device 200 may include a bus 210, a processing unit 220, a main memory 230, a ROM 240, a storage device 250, an input device 260, an output device 270, and a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
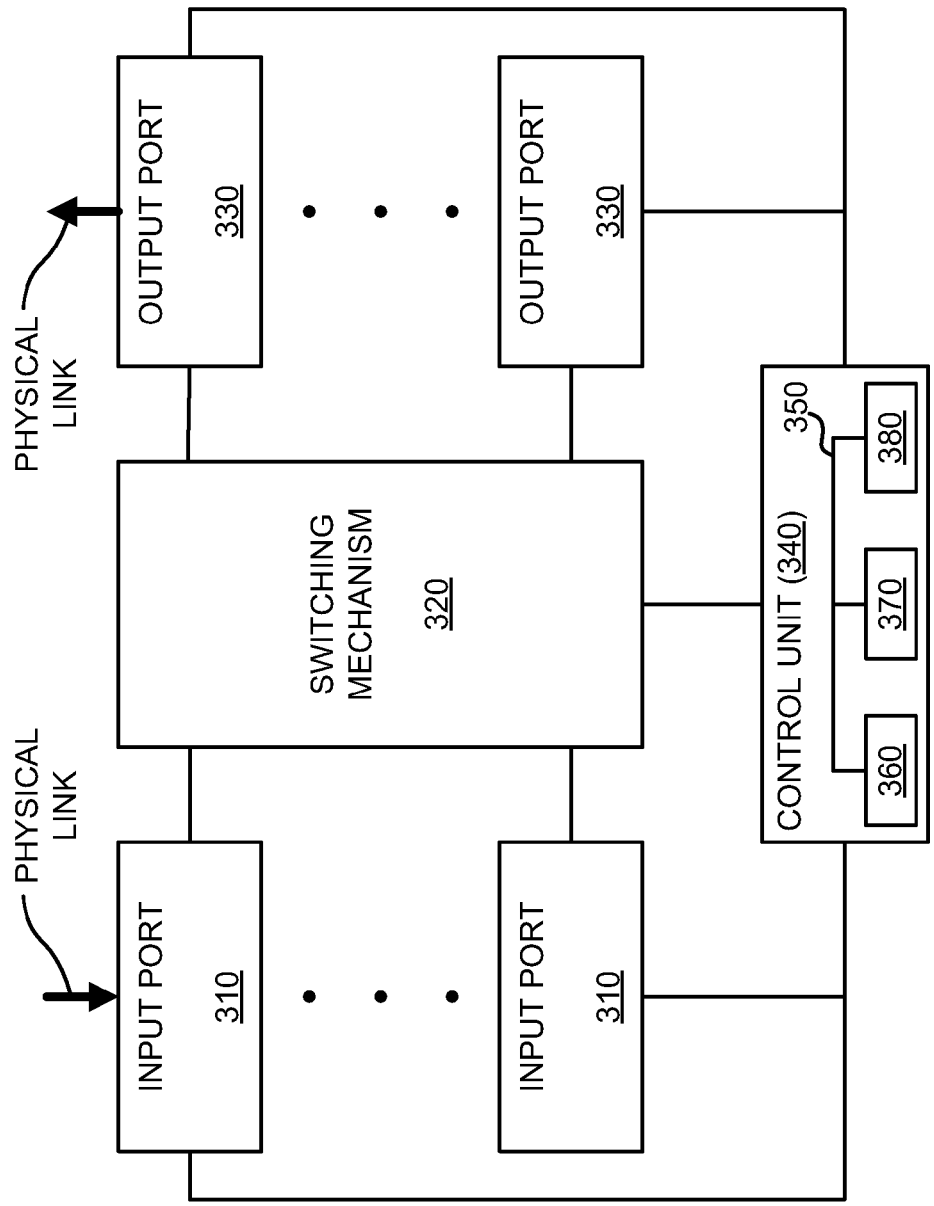
FIG. 3 is a diagram of example components of a network device or a switch depicted in FIG. 1.

FIG. 3 is a diagram of example components of a device 300 that may correspond to network device 120 or switch 125 (FIG. 1). As shown, device 300 may include input ports 310, a switching mechanism 320, output ports 330, and a control unit 340.

Input ports 310 may be a point of attachment for physical links and may be a point of entry for incoming traffic (e.g., packets). Input ports 310 may carry out data link layer encapsulation and decapsulation. In example implementations, input ports 310 may send (e.g., may be an exit point) and/or receive (e.g., may be an entry point) packets.

Switching mechanism 320 may interconnect input ports 310 with output ports 330. Switching mechanism 320 may be implemented using many different techniques. For example, switching mechanism 320 may be implemented via busses, crossbars, and/or with shared memories (e.g., which may act as temporary buffers to store traffic from input ports 310 before the traffic is eventually scheduled for delivery to output ports 330).

Output ports 330 may store packets and may schedule packets for service on output links (e.g., physical links). Output ports 330 may include scheduling algorithms that support priorities and guarantees. Output ports 330 may support data link layer encapsulation and decapsulation, and/or a variety of higher-level protocols. In example implementations, output ports 330 may send packets (e.g., may be an exit point) and/or receive packets (e.g., may be an entry point).

Control unit 340 may use routing protocols for forwarding packets. Control unit 340 may connect with input ports 310, switching mechanism 320, and output ports 330. Control unit 340 may implement routing protocols and/or run software to configure and manage device 300. Control unit 340 may handle any packet whose destination address may not be found.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input ports 310, for processing by processor 360, before a packet is directed back to the shared memories (e.g., in switching mechanism 320), queued in the shared memories (e.g., based on processing results), and eventually scheduled to be sent to output ports 330. Communication interface 380 may include any transceiver-like mechanism that enables control unit 340 to communicate with other devices and/or systems.

Device 300 may perform certain operations, as described herein. Device 300 may perform these operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
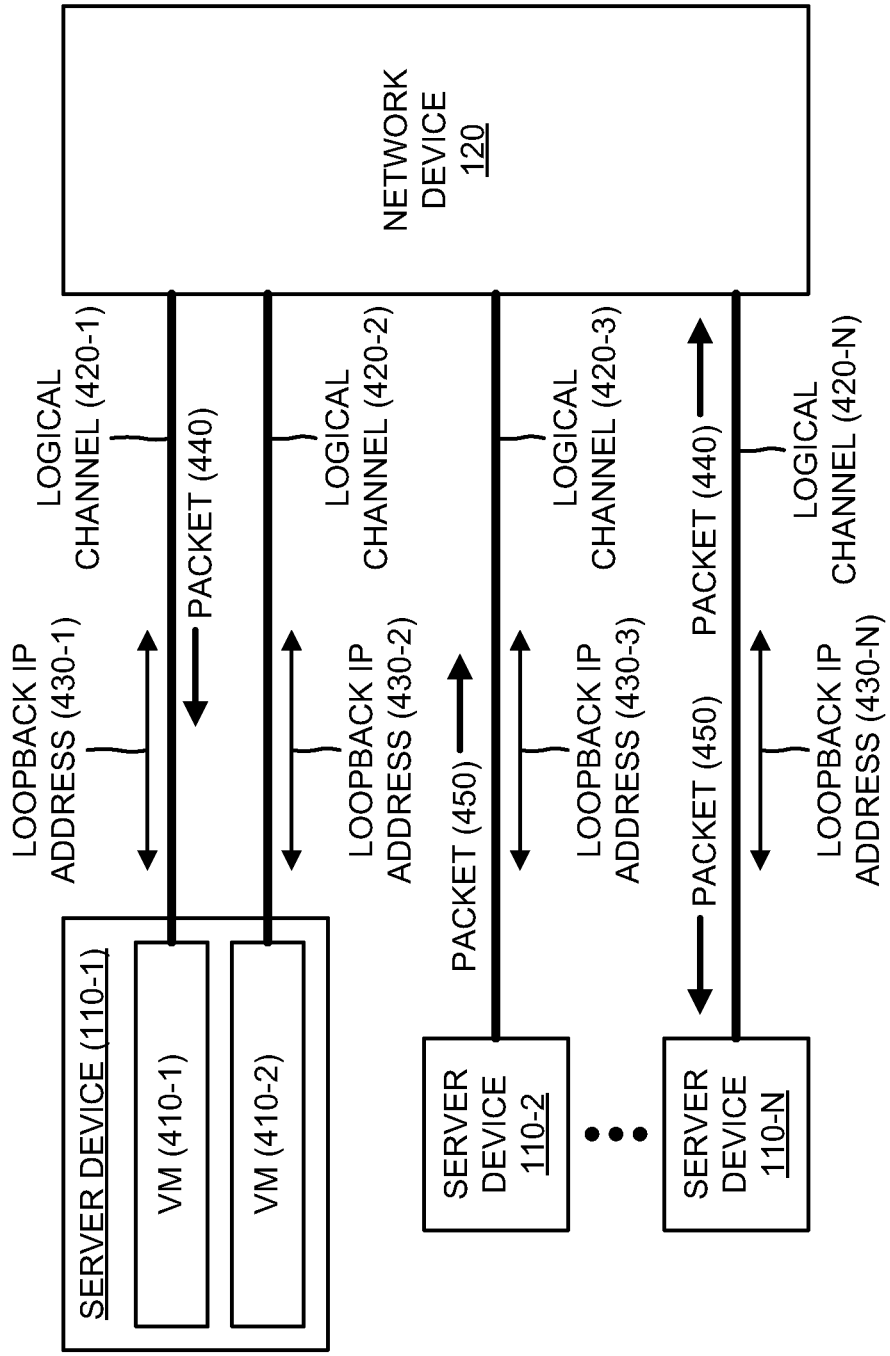
FIG. 4 is a diagram of example operations capable of being performed by an example portion of the network illustrated in FIG. 1.

FIG. 4 is a diagram of example operations capable of being performed by an example portion 400 of network 100. As shown, example network portion 400 may include server devices 110-1 through 110-N and network device 120. Server devices 110-1 through 110-N and network device 120 may include the features described above in connection with, for example, one or more of FIGS. 1-3.

As further shown in FIG. 4, server device 110-1 may include virtual machines (VMs) 410-1 and 410-2 (collectively referred to herein as "virtual machines 410," and singularly as "virtual machine 410"). In one implementation, each of server devices 110 may not include virtual machines 410 or may include one or more virtual machines 410. Virtual machine 410 may include a software implementation of a machine (i.e., a computer) that executes instructions like a physical machine. Virtual machine 410 may permit sharing of underlying physical machine (e.g., server device 110) resources between different virtual machines 410, with each virtual machine 410 running its own operating system.

Each virtual machine 410 or each server device 110 may have its own logical communication channel (also referred to herein as "a logical channel 420") to network device 120. For example, as shown in FIG. 4, network device 120 may establish a logical channel 420-1 with virtual machine 410-1, and may establish a logical channel 420-2 with virtual machine 410-2. Network device 120 may establish a logical channel 420-3 with server device 110-2, and may establish a logical channel 420-N with server device 110-N. Each logical channel 420 may be unique to a particular server device 110 or a particular virtual machine 410, and may not be shared with other server devices 110 and virtual machines 410. Logical channel 420 may provide a point-to-point link between a particular server device 110 or virtual machine 410 and network device 120.

In one example implementation, logical channel 420 may use a dedicated physical link between server device 110 and network device 120. Alternatively, logical channel 420 may share one or more physical links with other logical channels 420 connecting other server devices 110 to network device 120 (e.g., in a multiplexing scenario). In the multiplexing scenario, a packet (or frame) destined for a particular logical channel 420 (e.g., on a shared physical link) may include a virtual LAN (VLAN) tag (e.g., an identifier) that enables network device 120 (or switch 125) to distinguish the particular logical channel 420 from the other logical channels 420 provided on the shared physical link. Logical channel 420 may terminate on a virtual machine 410 or on a physical server device 110.

Logical channel 420 may provide a network for two nodes, i.e., server device 110 and network device 120. Both nodes may include one network interface connected to this network. The network may include a variety of IP scheme choices for network interfaces. For example, the network may include unnumbered interfaces, where no IP addresses may be assigned to the two network Interfaces. In another example, the network may include a small network for IPv4 (/30 or /31) or IPv6 (/126 or /127) and may provide ARP tables to map IP addresses to MAC addresses in order to encapsulate IP packets to Ethernet frames. An IP packet (e.g., with a source and destination address) may be pushed (or forwarded), via logical channel 420, to its ultimate destination (e.g., provided in the destination address). When it comes to routing the IP packet, the IP packet may be sent via a network with no IP addresses for network interfaces (case 1). Network device 120 may decide where to push, move, or forward the IP Packet based on next hop information (e.g., a next hop outbound interface and a next hop IP address). In the case of unnumbered interface, the next hop may include a name (or ID) of that interface (e.g., logical channel 420) and no IP address of the next hop.

Server devices 110 and virtual machines 410 may be configured with network loopback IP addresses 430. In one example implementation, network loopback IP addresses 430 may be provisioned in OSs of server devices 110 or virtual machines 410; may be provisioned in a hypervisor and communicated to server devices 110 or virtual machines 410; or may be assigned by network device 120 to server devices 110 or virtual machines through logical channels 420. Network device 120 may determine network loopback IP addresses 430. For example, as shown in FIG. 4, network device 120 may determine a network loopback IP address 430-1 for virtual machine 410-1, and may determine a network loopback IP address 430-2 for virtual machine 410-2. Network device 120 may determine a network loopback IP address 430-3 for server device 110-2, and may determine a network loopback IP address 430-N for server device 110-N. In one example implementation, network loopback IP addresses 430 may include a network /32 address (e.g., for IP version 4 (IPv4)) or a network /128 address (e.g., for IP version 6 (IPv6)), and may be used for all communications between server devices 110 (or virtual machines 410) and network device 120. Layer 2 addresses of server devices 110 may be irrelevant in such an arrangement.

Network device 120 may associate each network loopback IP address 430 with a corresponding logical channel 420. For example, network device 120 may associate network loopback IP address 430-1 with logical channel 420-1, may associate network loopback IP address 430-2 with logical channel 420-2, may associate network loopback IP address 430-3 with logical channel 420-3, and may associate network loopback IP address 430-N with logical channel 420-N.

Server devices 110 or virtual machines 410 may use network loopback IP addresses 430 to sign outgoing packets. For example, for a packet originated on virtual machines 410, an IP packet source address field may be populated with network loopback IP address 420. Network device 120 may use network loopback IP addresses 430 in routing tables (e.g., to tie information in IP routing records). Thus, network device 120 may associate each network loopback IP address 430 with a corresponding logical channel 420 for IP packet forwarding purposes.

As further shown in FIG. 4, network device 120 may receive a packet 440 (e.g., from server device 110-N via logical channel 420-N). In one example implementation, packet 440 may be sent over one of logical channels 420 with a variety of possible addresses for interfaces of network device 120. In one example, packet 440 may be sent over one of logical channels 420 via unnumbered IP address interfaces of network device 120. In another example, packet 440 may be sent over one of logical channels 420 using interfaces of network device 120 configured with network addresses /30 or /31 (e.g., for IPv4). In still another example, packet 440 may be sent over one of logical channels 420 using a Link Local Unicast address (e.g., for IPv6) for interfaces of network device 120. As shown in FIG. 4, network device 120 may provide packet 440 to virtual machine 410-1 via logical channel 420-1.

Current network servers use an IP address of a network interface as a source IP address for packets. In contrast, in implementations described herein, network loopback IP address 430 may be used as a source IP address of packets sent from server device 110. Different kinds of links (e.g., with different interface IP addresses) may be used between server device 110 and network device 120. However, the interface IP addresses may not be used in IP packets (e.g., they may be irrelevant to server device 110) so that live migration may be performed in network 100, changes may be made in network 100, etc.

As further shown in FIG. 4, server device 110-2 may provide a packet 450 to network device 120 via logical channel 420-3. In one example implementation, packet 450 may be sent over logical channel 420-3 with a variety of possible addresses for interfaces of server device 110-2. In one example, packet 450 may be sent over logical channel 420-3 via unnumbered IP address interfaces of server device 110-2. In another example, packet 450 may be sent over logical channel 420-3 via network /30 or network /31 address (e.g., for IPv4) interfaces of server device 110-2. In still another example, packet 450 may be sent over logical channel 420-3 via Link Local Unicast address (e.g., for IPv6) interfaces of server device 110-2. Network device 120 may receive packet 450, and may forward packet 450 to server device 110-N via logical channel 420-N.

In one example implementation, IP routes (e.g., of packets) on server devices 110 and network 120 may be used to push traffic (e.g., packets) from network device 120 to server devices 110, or from server devices 110 to network device 120. The IP routes may use interfaces, associated with server devices 110 and/or network device 120, as designations of next hops rather than IP addresses of point-to-point links. Thus, the functionality described in connection with FIG. 4 may eliminate a need for server devices 110 to maintain ARP tables.

In another example implementation, network device 120 may statically create logical channels 420 and IP routes via manual provisioning. Alternatively, network device 120 may dynamically create logical channels 420 and IP routes based on control plane signaling (e.g., used for changes in network 100 infrastructure) received from network management system 140, a management system for server devices 110, or a management system for network device 120. In one example, network device 120 may utilize a signaling protocol to receive such control plane signaling. The signaling protocol may provide reliable and secure communication between network device 120 and network management system 140, and may include optional procedures that permit network device 120 and network management system 140 to authenticate each other. The signaling protocol may generate signaling messages that create a new logical channel 420 over a particular physical interface; communicate of tags (e.g., VLAN tags) to be used for multiplexing; tear down an existing logical channel 420; inform network device 120 about an IP address used by a server device 110 on a specified logical channel 420; inform network device 120 about movement (or departure) of an IP address to another network device 120; inform network device 120 about movement (or arrival) of an IP address from another network device 120; etc.

In still another example implementation, server devices 110 or virtual machines 410 may migrate in network 100 (e.g., on the fly) from one network device 120 to another network device 120 by communicating a migration request to network management system 140 or individual network devices 120. In such a scenario, a departing network device 120 (e.g., from which server device 110/virtual machine 410 is migrating) may tear down an existing logical channel 420 to server device 110/virtual machine 410, and may modify an IP route of server device 110/virtual machine 410 to point to an arriving network device 120 (e.g., to which server device 110/virtual machine 410 is migrating). The arriving network device 120 may create a new logical channel 420 to server device 110/virtual machine 410, and may modify the IP route of server device 110/virtual machine 410 to point to the new logical channel 420.

Although FIG. 4 shows example components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400.

Figure 5:
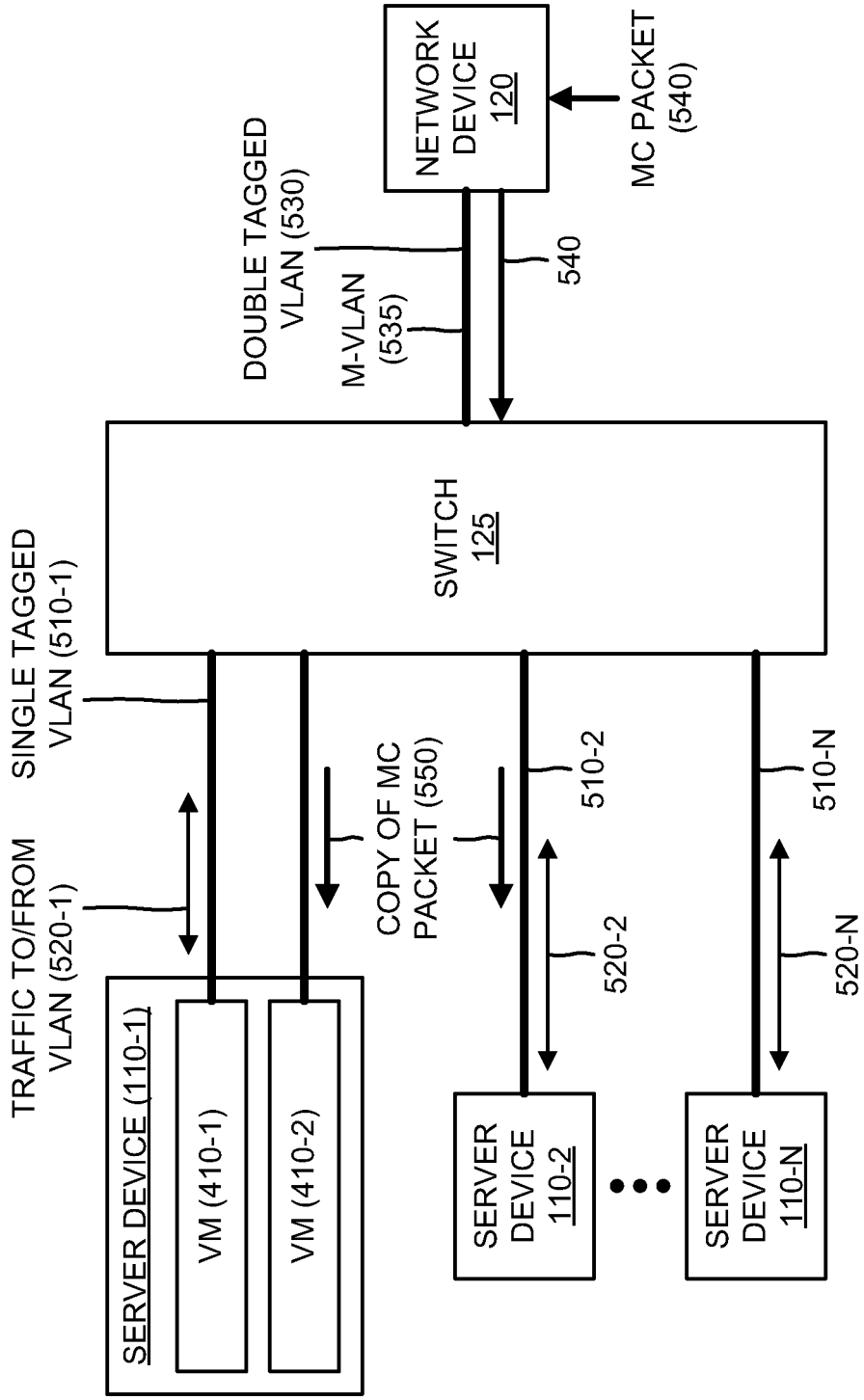
FIG. 5 is a diagram of example operations capable of being performed by another example portion of the network illustrated in FIG. 1.

FIG. 5 is a diagram of example operations capable of being performed by another example portion 500 of network 100. As shown, example network portion 500 may include server devices 110-1 through 110-N, network device 120, switch 125, and virtual machines 410-1 and 410-2. Server devices 110-1 through 110-N, network device 120, switch 125, and virtual machines 410-1 and 410-2 may include the features described above in connection with, for example, one or more of FIGS. 1-4.

In order to fully utilize physical interfaces of network device 120, links on network device 120 may be multiplexed toward server devices 110 and/or virtual machines 410 by applying VLAN tags (e.g., IEEE 802.1Q VLAN tags) as logical channel 420 identifiers and by using switch 125 as a traffic multiplexing (and/or aggregation) device. This architecture may permit single, double, or triple tagging (e.g., pursuant to IEEE 802.1Q) of packets. As shown in FIG. 5, a single tagged VLAN 510-1 may be established between server device 110-1 (e.g., virtual machines 410-1 and 410-2) and switch 125; another single tagged VLAN 510-2 may be established between server device 110-2 and switch 125; and still another single tagged VLAN 510-N may be established between server device 110-N and switch 125. Single tagged VLANs 510 may permit single tagged packets (traffic) to be exchanged between server devices 110 and switch 125. For example, single tagged VLAN 510-1 may permit traffic 520-1 to be exchanged between server device 110-1 and switch 125, single tagged VLAN 510-2 may permit traffic 520-2 to be exchanged between server device 110-2 and switch 125, and single tagged VLAN 510-N may permit traffic 520-N to be exchanged between server device 110-1 and switch 125.

As further shown in FIG. 5, a double tagged VLAN 530 or a multicast data VLAN (M-VLAN) 535 may be established between network device 120 and switch 125. Double tagged VLAN 530 may permit double tagged packets (traffic) to be exchanged between network device 120 and switch 125. M-VLAN 535 may include one or more VLAN tags on physical links between network device 120 and switch and between network device 120 and server devices 110. Double tagged VLAN 530 or M-VLAN 535 may exist on a multiplexed port of network device 120 and on all multiplexing devices (e.g., switch 125), and server devices 110 may not directly connect to double tagged VLAN 530 or M-VLAN 535. In one example implementation, a multicast packet may be delivered to server devices 110 (e.g., by network device 120 and switch 125) by sending a separate copy of the multicast packet to each interested server device 110 (e.g., for light multicast scenarios). Alternatively, a multicast packet may be delivered to server devices 110 (e.g., by network device 120 and switch 125) via M-VLAN 535.

For example, as shown in FIG. 5, network device 120 may receive a multicast (MC) packet 540 (e.g., from server device 110-N), and may provide MC packet 540 to switch 125 via double tagged VLAN 530. MC packet 540 may include a VLAN tag identifying single tagged VLAN 510-1 and another VLAN tag identifying single tagged VLAN 510-2 (i.e., a double VLAN tag). Switch 125 may receive MC packet 540, and may create two copies of MC packet 540. Switch 125 may associate the VLAN tag (e.g., identifying single tagged VLAN 510-1) with a first copy 550 of the MC packet, and may provide first copy 550 of the MC packet to server device 110-1 via single tagged VLAN 510-1 (e.g., based on the VLAN tag). Switch 125 may associate the VLAN tag (e.g., identifying single tagged VLAN 510-2) with a second copy 550 of the MC packet, and may provide second copy 550 of the MC packet to server device 110-2 via single tagged VLAN 510-2 (e.g., based on the VLAN tag).

In one example implementation, switch 125 may perform Internet Group Management Protocol (IGMP) snooping, and may copy multicast traffic received from double tagged VLAN 530 into a logical channel 420 toward a particular server device 110. Alternatively, network device 120 may perform IGMP operations based on reports received from a particular server device 110. Network device 120 may instruct (e.g., via signaling) switch 125 as to which multicast groups may be permitted to deliver (e.g., to the particular server device 110) replicating traffic from double tagged VLAN 530 to a logical channel 420 of the particular server device 110. Such signaling may be accomplished using an Access Node Control Protocol (ANCP) or other similar mechanisms.

In one example, switch 125 (or a software based Ethernet switch provided in network device 120) may replicate MC traffic to virtual machines 410, via logical channels 420. Switch 125 may inject MC packets in logical channels 420 toward virtual machines 410 based on IGMP snooping on logical channels 420, based on information received from network device 120, etc.

Although FIG. 5 shows example components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

FIGS. 6-9 are flow charts of an example process 600 for providing a highly scalable data center architecture with ARP-free servers according to implementations described herein. In one implementation, process 600 may be performed by network device 120. In another implementation, some or all of process 600 may be performed by another device (e.g., switch 125) in conjunction with network device 120.

Figure 6:
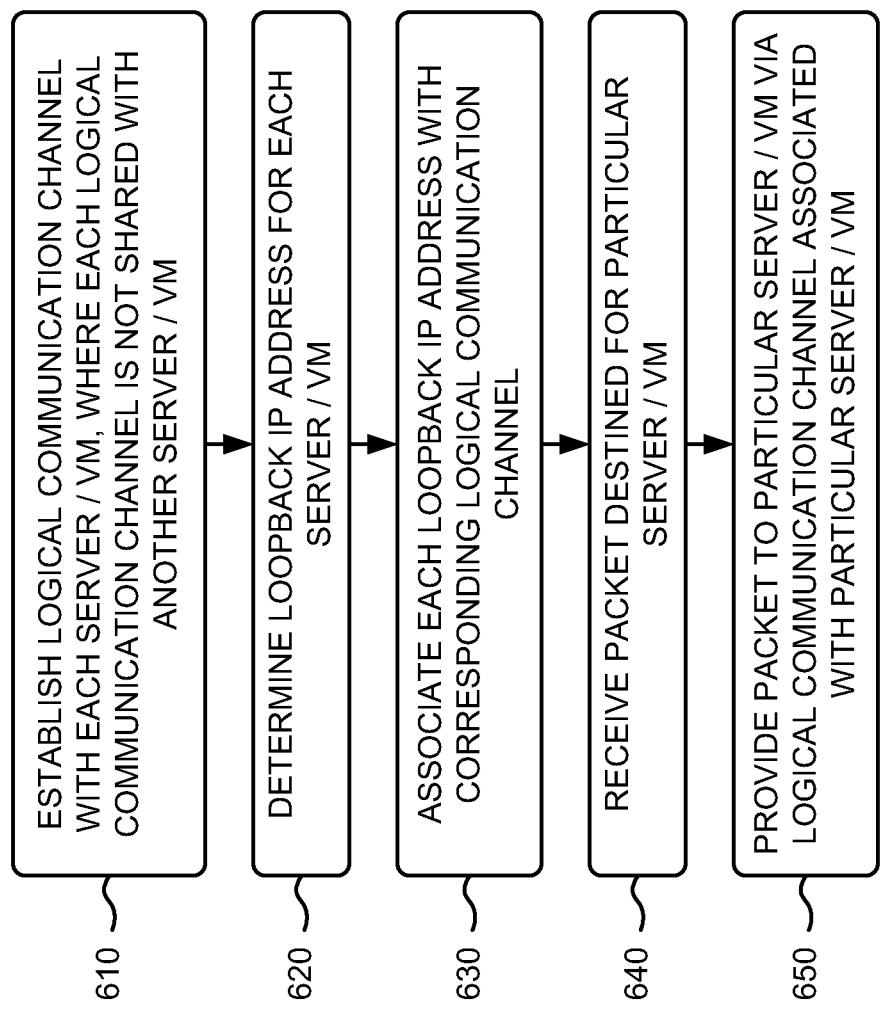
FIGS. 6-9 are flow charts of an example process for providing a highly scalable data center architecture with ARP-free servers according to implementations described herein.

As illustrated in FIG. 6, process 600 may include establishing a logical communication channel with each server device or virtual machine (VM), where each logical communication channel is not shared with another server device or virtual machine (block 610), and determining a network loopback IP address for each server device or virtual machine (block 620). For example, in implementations described above in connection with FIG. 4, each virtual machine 410 or each server device 110 may have its own logical communication channel (also referred to herein as "a logical channel 420") to network device 120. In one example, network device 120 may establish logical channel 420-1 with virtual machine 410-1, and may establish logical channel 420-2 with virtual machine 410-2. Network device 120 may establish logical channel 420-3 with server device 110-2, and may establish logical channel 420-N with server device 110-N. Server devices 110 and virtual machines 410 may be configured with network loopback IP addresses 430. In one example, network device 120 may determine network loopback IP address 430-1 for virtual machine 410-1, may determine network loopback IP address 430-2 for virtual machine 410-2, may determine network loopback IP address 430-3 for server device 110-2, and may determine network loopback IP address 430-N for server device 110-N.

As further shown in FIG. 6, process 600 may include associating each network loopback IP address with a corresponding logical communication channel (block 630). For example, in implementations described above in connection with FIG. 4, network device 120 may associate each network loopback IP address 430 with a corresponding logical channel 420. For example, network device 120 may associate network loopback IP address 430-1 with logical channel 420-1, may associate network loopback IP address 430-2 with logical channel 420-2, may associate network loopback IP address 430-3 with logical channel 420-3, and may associate network loopback IP address 430-N with logical channel 420-N.

Returning to FIG. 6, process 600 may include receiving a packet destined for a particular server device or virtual machine (block 640), and providing the packet to the particular server device or virtual machine via the logical communication channel associated with the server device or virtual machine (block 650). For example, in implementations described above in connection with FIG. 4, network device 120 may receive packet 440 (e.g., from client device 130 and via network 150). Packet 440 may be sent over one of logical channels 420 with a variety of possible addresses for interfaces of network device 120. Network device 120 may provide packet 440 to virtual machine 410-1 via logical channel 420-1 (e.g., associated with virtual machine 410-1).

Figure 7:
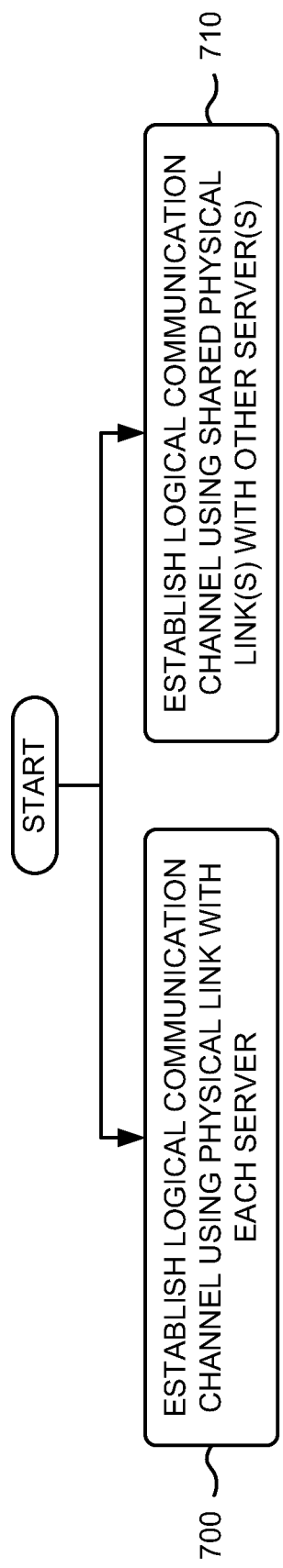

Process block 610 may include the process blocks depicted in FIG. 7. As shown in FIG. 7, process block 610 may include establishing a logical communication channel using a physical link with each server device (block 700) or establishing a logical using shared physical link(s) with other server device(s) (block 710). For example, in implementations described above in connection with FIG. 4, logical channel 420 may use a dedicated physical link between server device 110 and network device 120. Alternatively, logical channel 420 may share one or more physical links with other logical channels 420 connecting other server devices 110 to network device 120 (e.g., in a multiplexing scenario). In the multiplexing scenario, a packet destined for a particular logical channel 420 (e.g., on a shared physical link) may include a VLAN tag (e.g., an identifier) that enables the packet to distinguish the particular logical channel 420 from the other logical channels 420 provided on the shared physical link.

Figure 8:
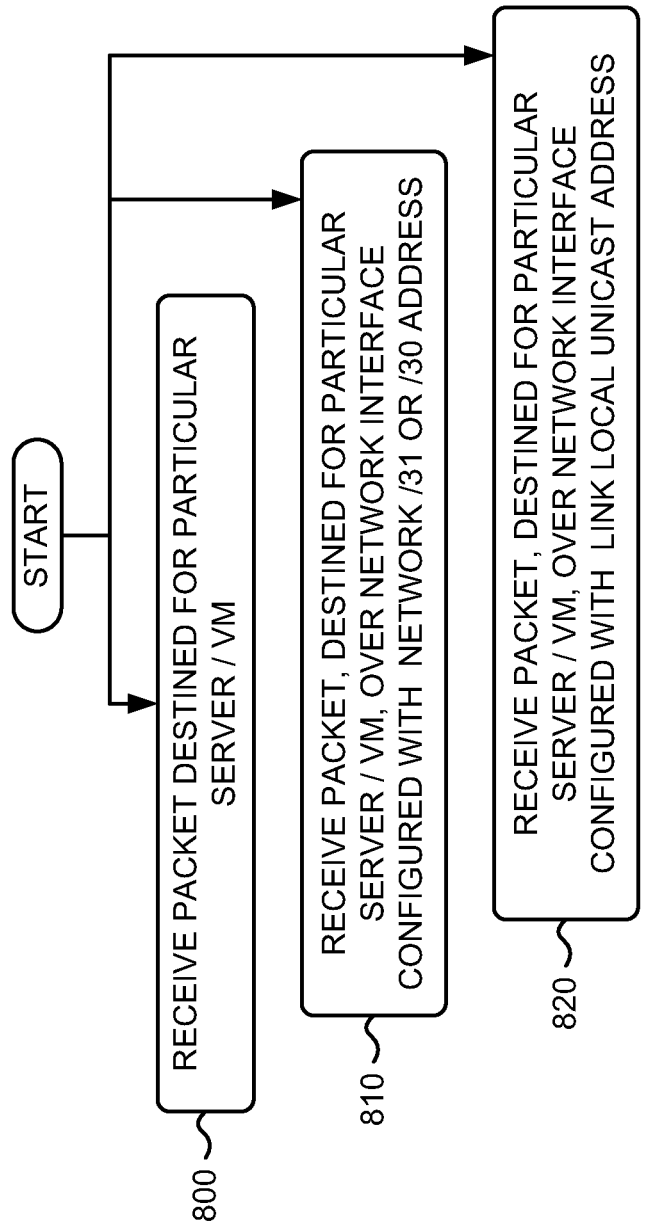

Process block 640 may include the process blocks depicted in FIG. 8. As shown in FIG. 8, process block 640 may include receiving the packet destined for the particular server device or virtual machine (block 800) receiving the packet, destined for the particular server device or virtual machine, over a network interface configured with a network /31/ or /30 address (block 810), or receiving the packet, destined for the particular server device or virtual machine, over a network interface configured with a Link Local Unicast address (block 820). For example, in implementations described above in connection with FIG. 4, packet 440 may be sent over one of logical channels 420 via unnumbered IP address interfaces of network device 120.

In another example, packet 440 may be sent over one of logical channels 420 using interfaces of network device 120 configured with network /30 or network /31 address (e.g., for IPv4). In still another example, packet 440 may be sent over one of logical channels 420 using a Link Local Unicast address (e.g., for IPv6) for interfaces of network device 120.

Figure 9:
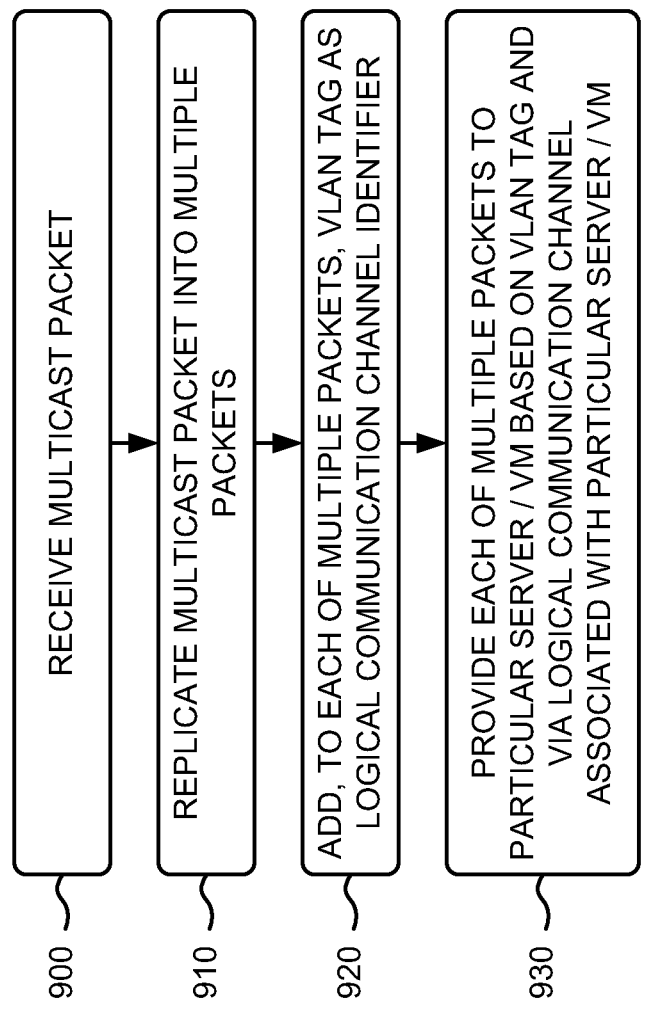

Process blocks 640 and 650 may include the process blocks depicted in FIG. 9. As shown in FIG. 9, process blocks 640 and 650 may include receiving a multicast packet (block 900), replicating the multicast packet into multiple packets (block 910), adding, to each of the multiple packets, a VLAN tag as a logical communication channel identifier (block 920), and providing each of the multiple packets to a particular server device or virtual machine based on the VLAN tag and via the logical channel associated with the particular server device or virtual machine (block 940). For example, in implementations described above in connection with FIG. 5, network device 120 may receive multicast (MC) packet 540, and may provide MC packet 540 to switch 125 via double tagged VLAN 530. MC packet 540 may include a VLAN tag identifying single tagged VLAN 510-1 and another VLAN tag identifying single tagged VLAN 510-2. Switch 125 may receive MC packet 540, and may create two copies of MC packet 540. Switch 125 may associate the VLAN tag (e.g., identifying single tagged VLAN 510-1) with first copy 550 of the MC packet, and may provide first copy 550 of the MC packet to server device 110-1 via single tagged VLAN 510-1 (e.g., based on the VLAN tag). Switch 125 may associate the VLAN tag (e.g., identifying single tagged VLAN 510-2) with second copy 550 of the MC packet, and may provide second copy 550 of the MC packet to server device 110-2 via single tagged VLAN 510-2 (e.g., based on the VLAN tag).

Systems and/or methods described herein may provide a highly scalable data center architecture with ARP-free servers. For example, the systems and/or methods may provide a logical communication channel between each server device (e.g., of a data center) and a network device (e.g., a router). Each logical communication channel may be dedicated to a particular server device and may not be shared with another server of the data center. Thus, each logical communication channel may provide a point-to-point link between the particular server device and the network device.

The systems and/or methods may remove MAC addresses from forwarding decision processes of server devices 110, which may eliminate a need for server devices 110 to use ARP or maintain ARP tables to locate MAC addresses of other server devices 110 in network 100. The systems and/or methods may permit a hypervisor hosting virtual machines (e.g., virtual machines 410) to utilize the same MAC address for all virtual machines (e.g., without uniqueness problems). Network device 120 also would not have to use ARP or populate ARP tables either initially or after network 100 topology changes. Rather, network device 120 may use any MAC address for sending IP packets to server devices 110. The systems and/or methods also do not require switch 125 to learn MAC addresses when multiplexing logical channels 420. With the systems and/or methods, all traffic between server devices 110 (or virtual machines 410) may be provided through network device 120 and may be bound to IP addresses (e.g., rather than Layer 2 addresses). One server device 110 may change its MAC address or physical location without impacting other peer server devices 110. The systems and/or methods may further provide network device 120 redundancy that does not require a Virtual Router Redundancy Protocol (VRRP) and failovers may occur more quickly. Network device 120 redundancy may be achieved by other means and there may not be a need to maintain a virtual MAC address of a default gateway.

The systems and/or methods may provide point-to-point links (e.g., logical channels 420) between two devices (e.g., server device 110 and network 120). Logical channels 420 may prevent spoofing on Layer 2 since a MAC address of server device 110 (e.g., chosen as a source in Ethernet packets) is irrelevant to network device 120 and other server devices 110. Logical channels 420 may also enable simple operations by switch 125, such as pushing and popping VLAN tags and forwarding a packet to exactly one physical interface (e.g., upstream or downstream). Logical channels 420 may eliminate broadcasts and broadcast storms, which may provides less interruptions of processors on server devices 110 network device 120. Logical channels 420 may eliminate flooding of unknown unicast traffic that can cause performance and security risks. Logical channels 420 may enable quick recovery after network topology changes, and may enable a Class of Service (CoS) policy to be configured and enforced for each server device 110 (and virtual machine 410) individually and dynamically moved from one network device 120 to another network device 120. Logical channels 420 may make it easy to troubleshoot and/or verify service for each individual server device 110.

The systems and/or methods may configure network loopback IP addresses 430 for server devices 110 and/or virtual machines 410. Network loopback IP addresses 430 may enable a virtual machine 410 to be moved to another NIC, another physical server device 110, or another network device 120 while steel keeping its IP address and without interrupting existing network connections. Network loopback IP addresses 430 may preclude pre-provisioning of a L2VPNs and/or a VPLS service between data centers for the purpose of live migration of server devices 110. Network loopback IP addresses 430 may prevent IP address spoofing (e.g., by configuring network loopback IP addresses 430 on network device 120 rather than switch 125).

The systems and/or methods may also enable use of control plane communication between network management system 140 and network 100. This may ensure that network 100 is aware of server devices 110, and server devices 110 are aware of network 100; that live migration of server devices 110 is a simple and transparent process; and that it is simple to dynamically change CoS for server device 110.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   establishing, by a network device, logical communication channels between a plurality of server devices and the network device,
      a particular logical communication channel, of the logical communication channels, being dedicated to a particular server device of the plurality of server devices, and
      the particular logical communication channel being not shared with any other server device of the plurality of server devices;
   determining, by the network device, network loopback Internet protocol (IP) addresses for the plurality of server devices;
   associating, by the network device, the network loopback IP addresses with the logical communication channels;
   receiving, by the network device, a packet;
   replicating, by the network device, the packet to obtain multiple packets;
   adding, by the network device and to a first packet of the multiple packets, a first logical communication channel identifier associated with the particular logical communication channel,
      the first logical communication channel identifier including a virtual local area network (VLAN) tag associated with the particular logical communication channel;
   adding, by the network device and to a second packet of the multiple packets, a second logical communication channel identifier associated with another logical communication channel of the logical communication channels;
   providing, by the network device, the first packet to the particular server device via the particular logical communication channel and based on the first logical communication channel identifier; and
   providing, by the network device, the second packet via the other logical communication channel and based on the second logical communication channel identifier.

2. The method of claim 1, where the packet includes one of:
   an Internet protocol (IP) version 4 (IPv4) network address, or
   an IP version 6 (IPv6) network address.

3. The method of claim 1, where the particular logical communication channel uses a dedicated physical link between the particular server device and the network device.

4. The method of claim 1, where the particular logical communication channel shares one or more physical links with the other logical communication channel.

5. The method of claim 1, where the particular logical communication channel defines a point-to-point link between the network device and the particular server device.

6. The method of claim 1, where the network device provides the first packet and the second packet without using or maintaining an Address Resolution Protocol (ARP) table.

7. The method of claim 1,
   where the network loopback IP addresses are provisioned in operating systems of the plurality of server devices,
   where the network loopback IP addresses include a particular loopback network address that is provisioned in an operating system, of the operating systems, of the particular server device, and
   where the method further comprises:
      receiving, from the particular server device, a particular packet that includes the particular loopback network address.

8. A network device comprising:
   a memory; and
   a processor to:
      establish logical channels between the plurality of server devices and the network device,
         a particular logical channel, of the logical channels, being dedicated to a particular server device of the plurality of server devices, and
         the particular logical channel being not shared with any other server device of the plurality of server devices,
      determine network loopback Internet protocol (IP) addresses for the plurality of server devices,
      associate the network loopback IP addresses with the logical channels,
      receive a packet,
      replicate the packet to obtain multiple packets,
      add, to a first packet of the multiple packets, a first logical channel identifier associated with the particular logical channel,
         the first logical channel identifier including a virtual local area network (VLAN) tag identifying a VLAN associated with the particular logical channel,
      add, to a second packet of the multiple packets, a second logical channel identifier associated with another logical channel of the logical channels,
      provide the first packet to the particular server device via the particular logical channel and based on the first logical channel identifier, and
      provide the second packet via the other logical channel and based on the second logical channel identifier.

9. The network device of claim 8, where the packet includes one of:
   an Internet protocol (IP) version 4 (IPv4) network address, or
   an IP version 6 (IPv6) network address.

10. The network device of claim 8, where the particular logical channel uses a physical link between the particular server device and the network device.

11. The network device of claim 8, where the particular logical channel shares one or more physical links with the other logical channel.

12. The network device of claim 8, where the particular logical channel defines a point-to-point link between the network device and the particular server device.

13. The network device of claim 8, where the network device provides the first packet without a media access control (MAC) address being maintained for the particular server device.

14. A non-transitory computer-readable medium storing instructions, the instructions comprising:
one or more instructions that, when executed by at least one processor of a device, cause the at least one processor to:
establish logical communication channels between a plurality of virtual machines and the device,
a particular logical communication channel, of the logical communication channels, being dedicated to a particular virtual machine of the plurality of virtual machines, and
the particular logical communication channel being not shared with any other virtual machine of the plurality of virtual machines;
determine network loopback Internet protocol (IP) addresses for the plurality of virtual machines;
associate the network loopback IP addresses with the logical communication channels;
receive a packet;
replicate the packet to obtain a first packet and a second packet;
add, to the first packet, a first identifier associated with the particular logical communication channel;
add, to the second packet, a second identifier associated with another logical communication channel of the logical communication channels;
provide the first packet, including the first identifier, to the particular virtual machine via the particular logical communication channel,
the first identifier including a virtual local area network (VLAN) tag associated with the particular virtual machine; and
provide the second packet via the other logical communication channel and based on the second identifier.

15. The non-transitory computer-readable medium of claim 14, where the packet includes one of:
an Internet protocol (IP) version 4 (IPv4) network address, or
an IP version 6 (IPv6) network address.

16. The non-transitory computer-readable medium of claim 14, where the particular logical communication channel defines a point-to-point link between the device and the particular virtual machine.

17. The non-transitory computer-readable medium of claim 14, where the particular logical communication channel uses a dedicated physical link.

18. The non-transitory computer-readable medium of claim 14, where the particular logical communication channel shares one or more physical links with the other logical communication channel.

19. The non-transitory computer-readable medium of claim 14, where a hypervisor hosts the particular virtual machine and the other virtual machine.

20. The non-transitory computer-readable medium of claim 14, where the particular virtual machine and the other virtual machine use a same media access control (MAC) address.

* * * * *